(12) United States Patent
Stone

(10) Patent No.: US 7,458,191 B2
(45) Date of Patent: *Dec. 2, 2008

(54) FLOOR TILE

(75) Inventor: Norman Stone, Harrison, NY (US)

(73) Assignee: Tru Woods Limited, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/595,559

(22) Filed: Nov. 9, 2006

(65) Prior Publication Data

US 2007/0163194 A1    Jul. 19, 2007

Related U.S. Application Data

(63) Continuation-in-part of application No. 11/321,015, filed on Dec. 29, 2005, now Pat. No. 7,155,871.

(51) Int. Cl.
*E04B 2/08* (2006.01)
*E04B 2/18* (2006.01)
*E04B 2/32* (2006.01)
*E04B 2/46* (2006.01)

(52) U.S. Cl. .............. 52/591.4; 52/506; 52/611; 52/451; 52/462; 428/47; 428/189

(58) Field of Classification Search ............... 52/591.4, 52/403.1, 391, 392, 451, 454, 462, 420, 416, 52/741.3; 428/40.1, 42.3, 40.4, 60, 54, 157; 156/289, 247, 249, 543

See application file for complete search history.

(56) References Cited

U.S. PATENT DOCUMENTS

| 1,978,075 A | 10/1934 | Butterworth |
| 2,189,218 A | 2/1940 | Neumiester |
| 2,914,815 A | 12/1959 | Alexander |
| 3,247,638 A | 4/1966 | Gay |
| 3,554,850 A | 1/1971 | Kuhle |
| 3,657,852 A | 4/1972 | Worthington et al. |
| 3,859,000 A | 1/1975 | Webster |
| 3,988,187 A | 10/1976 | Witt et al. |
| 4,090,338 A | 5/1978 | Bourgade |
| 4,426,820 A | 1/1984 | Terbrack et al. |
| 4,644,720 A | 2/1987 | Schneider |
| 5,111,630 A | 5/1992 | Munsey et al. |

(Continued)

FOREIGN PATENT DOCUMENTS

CA    2 468 532    6/2003

(Continued)

*Primary Examiner*—Richard E. Chilcot, Jr.
*Assistant Examiner*—Chi Q Nguyen
(74) *Attorney, Agent, or Firm*—Rodman & Rodman

(57) ABSTRACT

The floor tile is a laminate of two layers of flexible plastic sheet material laminated together in offset relationship to define an offset marginal portion for each of the layers. Each of the offset marginal portions have oppositely facing adhesive coated surfaces. A foam layer and/or a fiberglass sheet can also be included in the laminate structure of the floor tile. The floor tile can conform to surface contours of a floor base. The bottom layer of the floor tile, whether it is plastic sheet or foam, is conformable to surface irregularities of the floor base. A one piece releasable packaging device covers the oppositely facing adhesive coated surfaces of the offset marginal portions.

26 Claims, 8 Drawing Sheets

U.S. PATENT DOCUMENTS

| | | |
|---|---|---|
| 5,179,812 A | 1/1993 | Hill |
| 5,404,686 A | 4/1995 | Esposito |
| 5,417,026 A | 5/1995 | Brumfield |
| 5,711,128 A | 1/1998 | Kordelin |
| 5,750,227 A | 5/1998 | Adams |
| 6,029,416 A | 2/2000 | Andersson |
| 6,119,423 A | 9/2000 | Costantino |
| 6,156,402 A | 12/2000 | Smith |
| 6,591,568 B1 | 7/2003 | Palsson |
| 6,601,359 B2 | 8/2003 | Olafsson |
| 6,647,690 B1 | 11/2003 | Martensson |
| 6,691,480 B2 | 2/2004 | Garcia |
| 6,751,917 B2 | 6/2004 | Mao |
| 6,769,218 B2 | 8/2004 | Pervan |
| 6,786,019 B2 | 9/2004 | Thiers |
| 6,794,001 B2 | 9/2004 | Chen et al. |
| 6,823,638 B2 | 11/2004 | Stanchfield |
| 6,869,985 B2 | 3/2005 | Mohanty et al. |
| 7,155,871 B1 * | 1/2007 | Stone et al. ................ 52/591.4 |
| 7,322,159 B2 * | 1/2008 | Stone et al. ................ 52/591.4 |
| 2007/0175137 A1 * | 8/2007 | Stone et al. ................ 52/295 |

FOREIGN PATENT DOCUMENTS

| | | |
|---|---|---|
| DE | 1914705 A1 | 10/1970 |
| DE | 3031036 A1 | 3/1982 |
| DE | WO 9949152 | 9/1999 |
| DE | 20108723 | 5/2001 |
| DE | 202 14 720 U1 | 1/2003 |
| DE | 203 07 987 U1 | 10/2004 |
| GB | 1308011 | 2/1973 |
| JP | S4930420 | 8/1974 |
| JP | S5249519 | 4/1977 |

* cited by examiner

FLOOR TILE

CROSS-REFERENCE TO RELATED APPLICATIONS

This application is a continuation-in-part of application Ser. No. 11/321,015 filed Dec. 29, 2005 and now U.S. Pat. No. 7,155,871 which issued on Jan. 2, 2007. A divisional of Ser. No. 11/321,015, filed Oct. 11, 2006 as Ser. No. 11/545,834 is now U.S. Pat. No. 7,322,159.

BACKGROUND OF THE INVENTION

1. Field of the Invention

This invention relates to a floor tile that can be installed on a floor base without being bonded to the floor base, and more particularly, to a flexible floor tile that is securable to similar adjacent floor tiles on a floor base and is conformable to surface contours and surface irregularities of the floor base. The invention also relates to a packaging system for the floor tile.

2. Related Prior Art

U.S. Pat. No. 1,978,075 to Butterworth discloses a wood block flooring with a tongue and groove engagement system for securement of similar blocks in side-by-side relationship. Since the blocks are formed of wood they are generally rigid and inflexible, and do not easily conform to surface contours and surface irregularities of a floor base. The woodblocks are also secured to a floor base using mastic or nailing.

U.S. Pat. No. 2,914,815 to Alexander shows an interlocked flooring system wherein individual blocks have offset base members formed of plywood. The plywood base members are laminated to the blocks and permit securement of similar blocks in side-by-side arrangement. The plywood base members are also generally rigid and inflexible. Thus the blocks do not easily conform to surface contours and surface irregularities of a floor base.

U.S. Pat. No. 3,554,850 to Kuhle shows parquet flooring with projecting parts for side-by-side securement of similar parquet sections. The parquet flooring is generally rigid and inflexible and thus cannot easily conform to surface contours and surface irregularities of a floor base.

DESCRIPTION OF THE DRAWINGS

In the accompanying drawings.

Corresponding reference numbers indicate corresponding parts throughout the several views of the drawings.

DETAILED DESCRIPTION OF THE INVENTION

Figure 1:
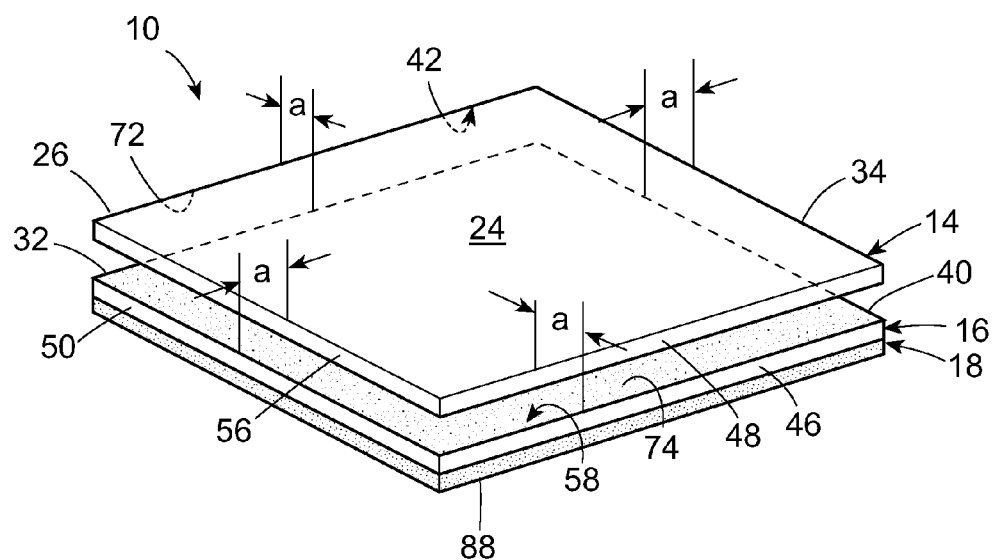
FIG. 1 is a perspective view of a floor tile incorporating one embodiment of the present invention.

Referring to the drawings, a floor tile incorporating a preferred embodiment of the invention is generally indicated by the reference number 10 in FIG. 1.

The floor tile 10 is a laminate of a top layer 14 of flexible plastic sheet material, a middle layer 16 of flexible-plastic sheet material and a bottom layer 18 of flexible foam material. All of the layers 14, 16 and 18 are of identical square size and shape.

The top layer 14 and the middle layer 16 are preferably formed of a synthetic plastic material, preferably a vinyl plastic material such as polyvinyl chloride sheeting material. An upper surface 24 of the top layer 14 is provided with a design such as a synthetic wood grain design (FIG. 6) that resembles natural wood. The bottom layer 18 is formed of a soft flexible foam material such as polyurethane foam.

The middle plastic layer 16 and bottom foam layer 18 are laminated together such that they are coextensive and have a common periphery. However the top plastic layer 14 is laminated to the middle plastic layer 16 such that the top layer 14 is offset from the middle layer 16.

In the offset layer arrangement a side edge 26 (FIG. 1) of the top layer 14 extends an offset amount "a" beyond a corresponding side edge 32 of the middle layer 16 and another side edge 34 of the top layer 14, perpendicular to the side edge 26, extends an offset amount "a" beyond a corresponding side edge 40 of the middle layer 16 to define an offset L-shaped marginal section 42 of the top layer 14.

Also in the offset layer arrangement a side edge 46 (FIG. 1) of the middle layer 16 extends an offset amount "a" beyond a corresponding side edge 48 of the top layer 14, and another side edge 50 of the middle layer 16 perpendicular to the side edge 46, extends an offset amount "a" beyond a corresponding side edge 56 of the top layer 14 to define an offset L-shaped marginal section 58 of the middle layer 16.

The L-shaped marginal section 42 of the top layer 14 and the L-shaped marginal section 58 of the middle layer 16 are of identical size and shape.

A suitable bonding or adhesive composition for laminating the top plastic layer 14 and middle plastic layer 16 together has the following components, the amounts of which are approximate:

a) 35% SIS (styrene-isoprene-styrene elastomer)
b) 54.5% petroleum resin
c) 10% mineral oil
d) 0.05% oxidation resistant BHT (2,6-di-tert-butyl-p-cresol)

Figure 3:
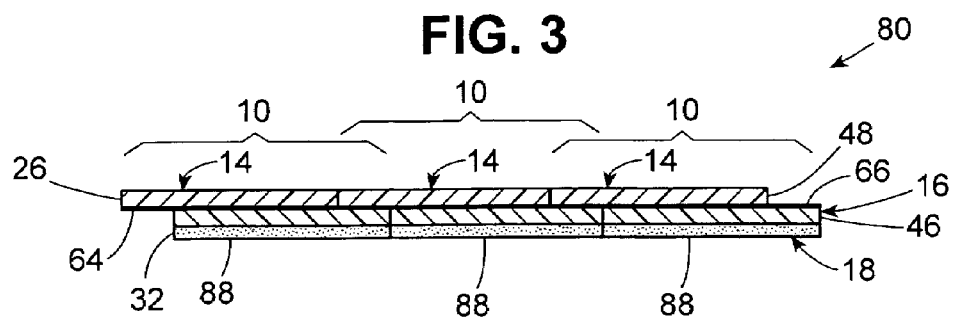
FIG. 3 is a sectional view taken on the line 3-3 of FIG. 2.
Figure 4:
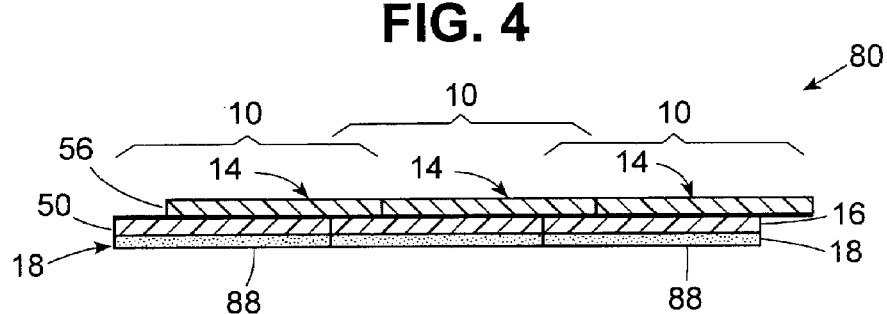
FIG. 4 is a sectional view taken on the line 4-4 of FIG. 2.

The bonding material for the layers 14 and 16 is provided on a lower surface 64 (FIG. 3) of the top plastic layer 14 and on an upper surface 66 of the middle plastic layer 16.

The same bonding material applied to the lower surface 64 and the upper surface 66 for laminating top plastic layer 14 and the middle plastic layer 16 can also be used for laminating the bottom foam layer 18 to the middle plastic layer 16.

The L-shaped marginal section 42 has a downwardly directed adhesive surface 72 (FIG. 1) that is part of the lower surface 64 (FIG. 3) of the top layer 14 and the L-shaped marginal section 58 has an upwardly directed adhesive surface 74 (FIG. 1) that is part of the upper surface 66 (FIG. 3) of the middle layer 16. The adhesive on the exposed adhesive surfaces 72 and 74 is the bonding material used for laminating the top plastic layer 14 and the middle plastic layer 16 together.

Although the dimensions of the floor tile 10 are a matter of choice, a suitable size for the top layer 14, the middle layer 16 and the bottom layer 18 can be for example, 12 inches by 12 inches. Smaller or larger size square tiles are a matter of choice. The thickness of the top layer 14 can be, for example, approximately 2.0 mm and the thickness of the middle layer 16 can be, for example, approximately 2.5 mm. The thickness of the bottom foam layer 18 can be, for example, approximately 3 mm. The marginal offset "a" can be, for example, approximately ¾ of an inch. Larger offsets can be provided for larger tiles.

Figure 5:
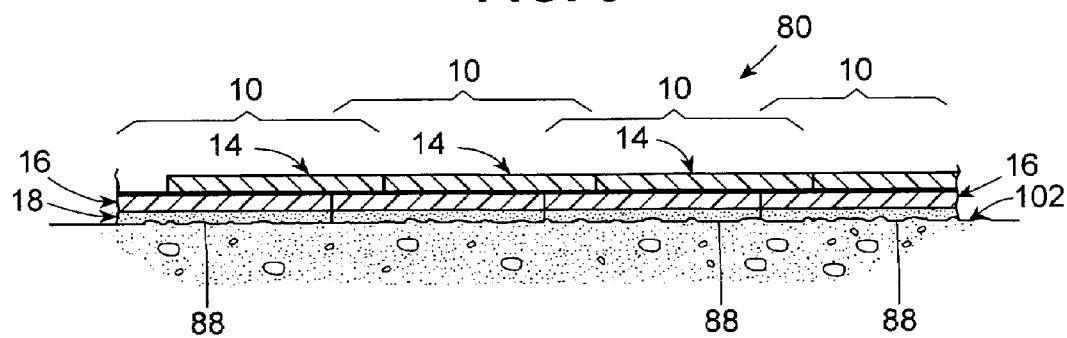
FIG. 5 is a sectional view thereof on a floor base.
Figure 6:
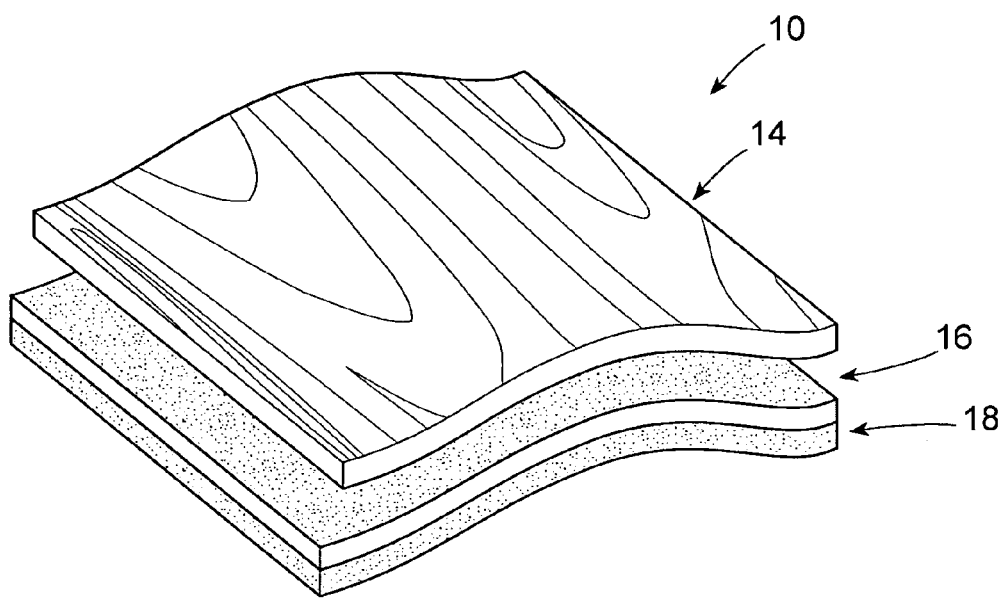
FIG. 6 is a perspective view showing the flexibility characteristics of the floor tile.

The floor tile 10 is sufficiently flexible, as schematically indicated in FIG. 6, to conform to typical variations in surface contour of a floor base 102 (FIG. 5) upon which the floor tile 10 is laid. In addition, the flexible foam material of the bottom layer 18 is yieldable to small bumps and other imperfections in the floor base 102 generally referred to as surface irregularities. The bottom foam layer 18 thus enables the floor tile 10 to conform to such surface irregularities and lie flat on the floor base 102.

Figure 2:
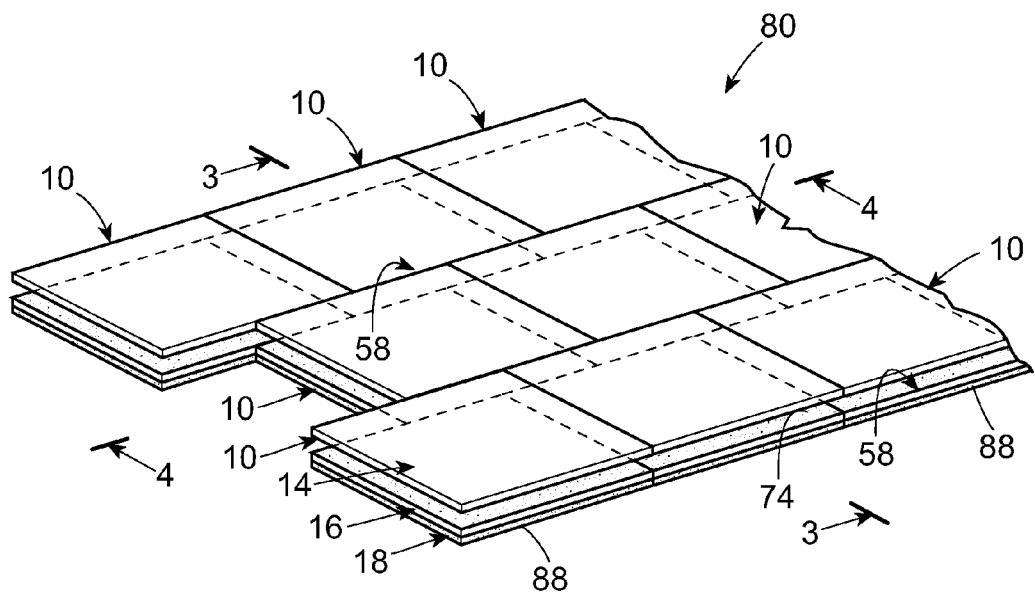
FIG. 2 is a perspective view of an assembly pattern thereof.

During installation of the floor tiles 10 in side-by-side and end-to-end relationship, the downwardly directed adhesive surface 72 (FIG. 1) of the L-shaped marginal section 42 of the top layer 14 is positioned to engage the upwardly directed adhesive surface 74 of the L-shaped marginal section 58 of the middle layer 16 to form the assembly 80 of the floor tiles 10 as shown in FIG. 2. When placing two of the tiles 10 together, one of the tiles 10 can be angled at approximately 45 degrees (not shown) with respect to the floor base 102 and onto the corresponding upwardly facing adhesive surface 74 (FIG. 1) of an adjacent floor tile 10.

The floor tile assembly pattern 80 (FIG. 2) is but one example of numerous possible tile patterns known in the art.

The floor tiles 10 can be installed on the floor base 102 (FIG. 5) without mastic or an adhesive coating on the floor base 102, and without mastic or adhesive on an undersurface 88 (FIG. 3) of the bottom foam layer 18. Thus during installation, the floor tiles 10 can be placed on a dry floor base surface 102 for easy shifting to any selected position, thereby facilitating installation of the floor tiles 10 in any desired pattern.

Preferably the installation of floor tiles 10 should start in a corner of a room (not shown) and proceed outwardly therefrom. An expansion gap of ¼ inch for example, from each wall is generally suitable for most installations. The expansion gap is usually covered by molding. It has also been found helpful to provide double faced tape on the first row of floor tiles 10 to help maintain the first row in place during the positioning of adjacent floor tiles 10.

The top layer 14, the middle layer 16 and the bottom layer 18 of the floor tile 10 are provided with an overall thickness that enables the floor tile 10 to be easily cut with a utility knife, if trimming is needed. Ease of trimming the floor tile 10 and the mastic free placement of the tiles 10 on a floor base 102 make it convenient for a do-it-yourselfer to install the floor tiles 10.

Figure 7:
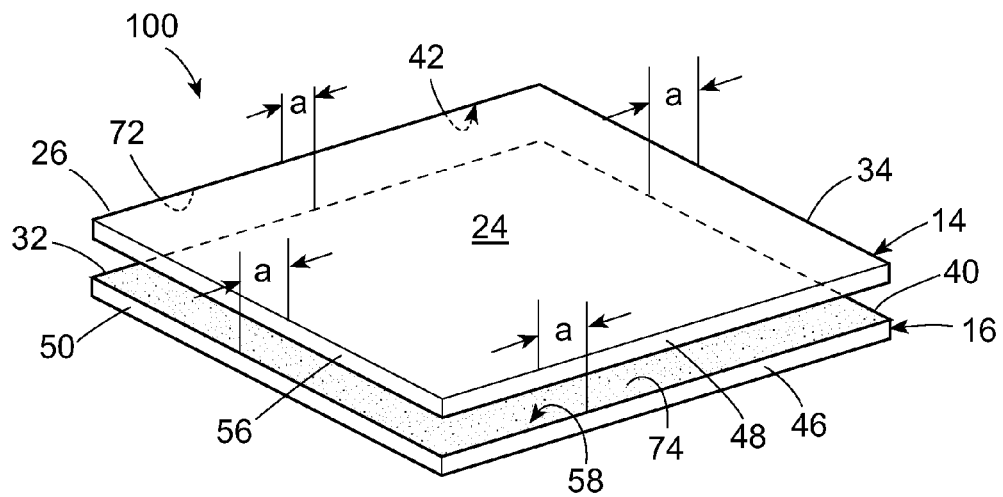
FIG. 7 is a perspective view of a floor tile incorporating another embodiment of the invention.

Another embodiment of the floor tile is generally indicated by the reference number 100 in FIG. 7.

The floor tile 100 is a laminate of the top layer 14 and the middle layer 16 of the floor tile 10, with the bottom foam layer 18 being omitted. The layers 14 and 16 are laminated together with marginal offsets "a" as previously described with respect to the floor tile 10.

The floor tile 100 thus includes identical L-shaped marginal sections 42 and 58 with identical offsets "a".

Figure 8:
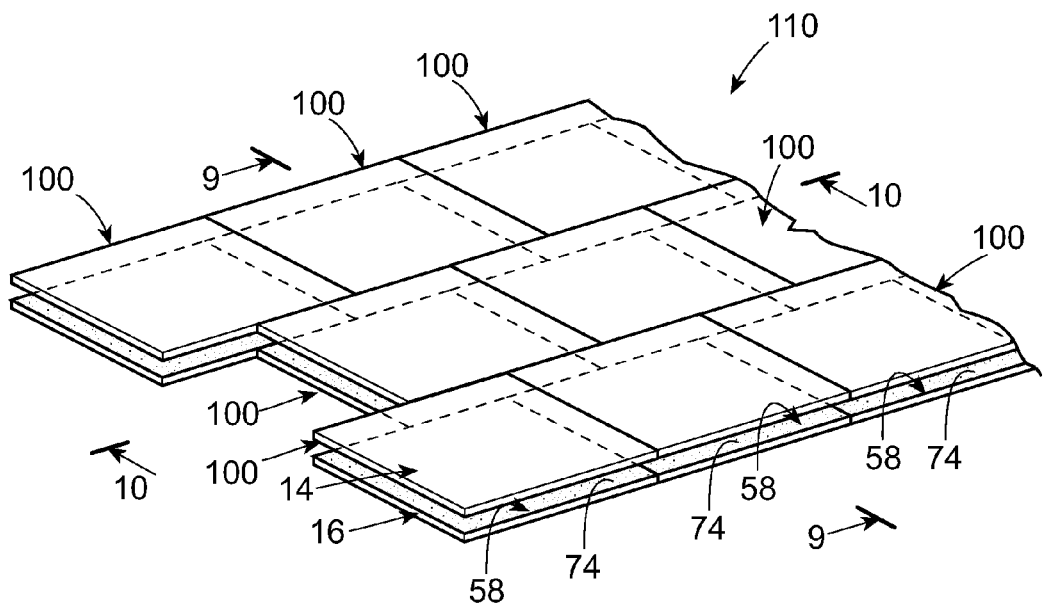
FIG. 8 is a perspective view of an assembly pattern thereof.

In installing the floor tile 100 on a floor base 102 (FIG. 11), a lower surface 104 of the layer 16 can be free of any mastic or adhesive covering and placed in direct contact with the floor base 102. The floor base 102 can also remain free of any mastic or adhesive covering. Installation of the floor tiles 100 in a tile assembly pattern 10 (FIG. 8) is accomplished in a manner similar to that previously described for the installation of the floor tile 10 in the tile assembly pattern 80 (FIG. 2).

Figure 9:
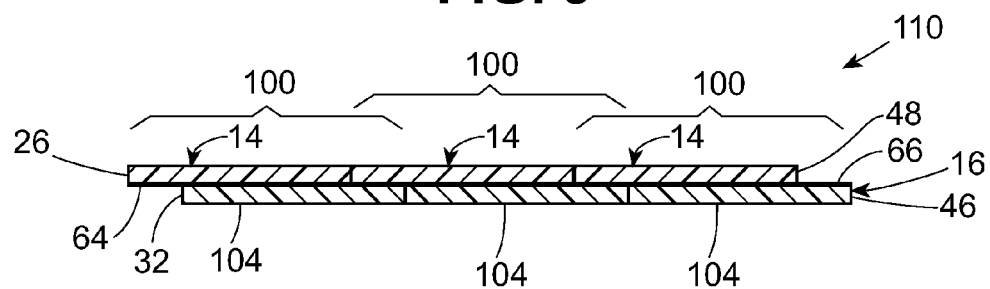
FIG. 9 is a sectional view taken on the line 9-9 of FIG. 8.
Figure 10:
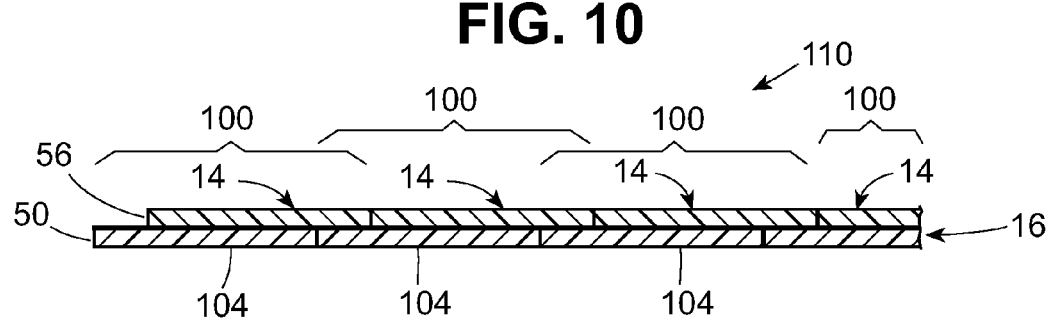
FIG. 10 is a sectional view taken on the line 10-10 of FIG. 8.
Figure 11:
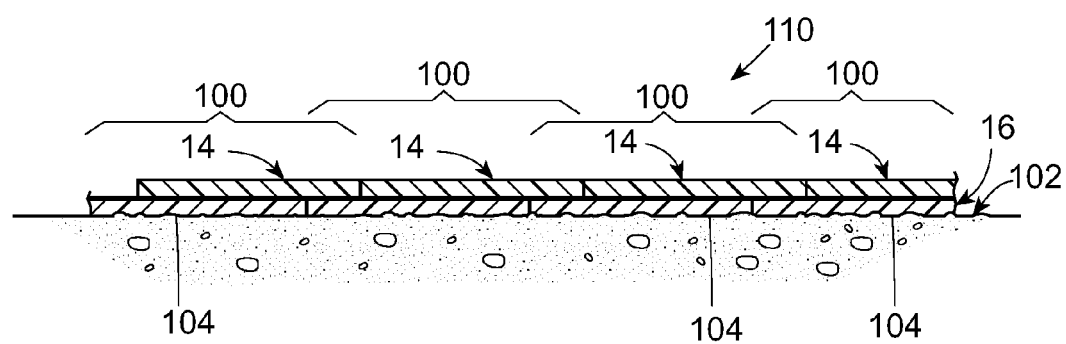
FIG. 11 is a sectional view thereof on a floor base.

The lower surface 104 (FIGS. 9 and 10) of the layer 16 which contacts the floor base 102 (FIG. 11) is yieldable to surface irregularities of the floor base 102 and thus enables the floor tile 100 to conform to such surface irregularities and lie flat on the floor base 102, as shown in FIG. 11.

Figure 12:
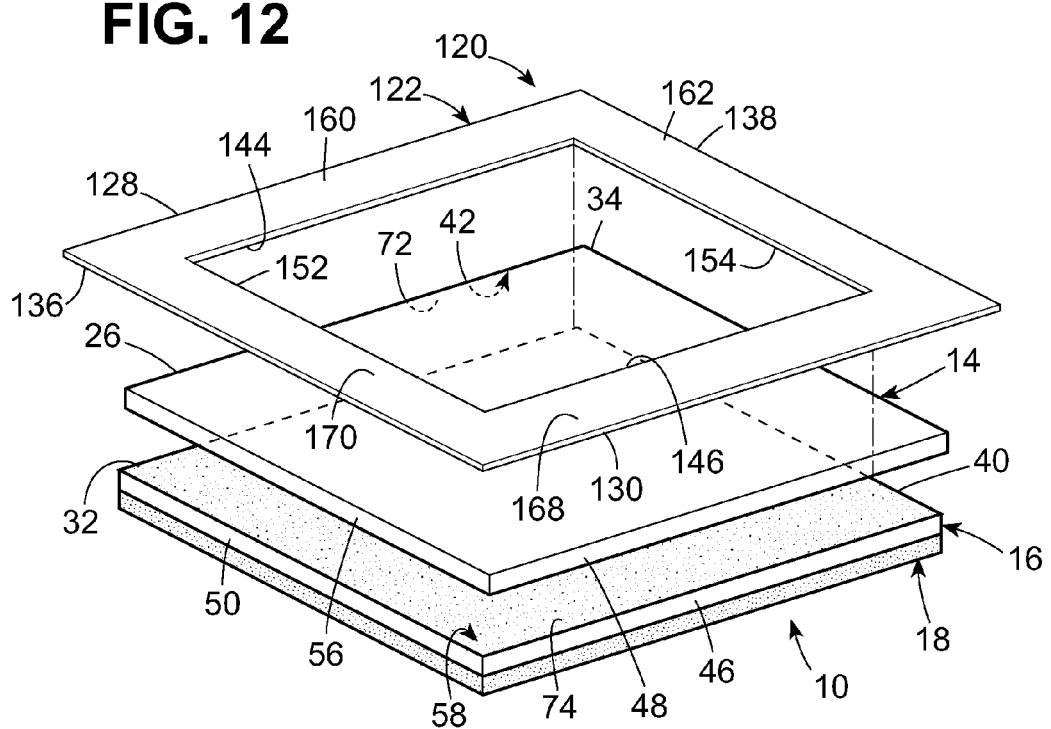
FIGS. 12-14 are perspective views of a packaging system for the floor tile incorporating another embodiment of the invention, before, during and after installation in a floor tile.

A packaging system for the floor tile is generally indicated by the reference number 120 in FIG. 12.

The packaging system 120 will be described in connection with the floor tile 10 but is equally applicable to the floor tile 100.

Figure 15:
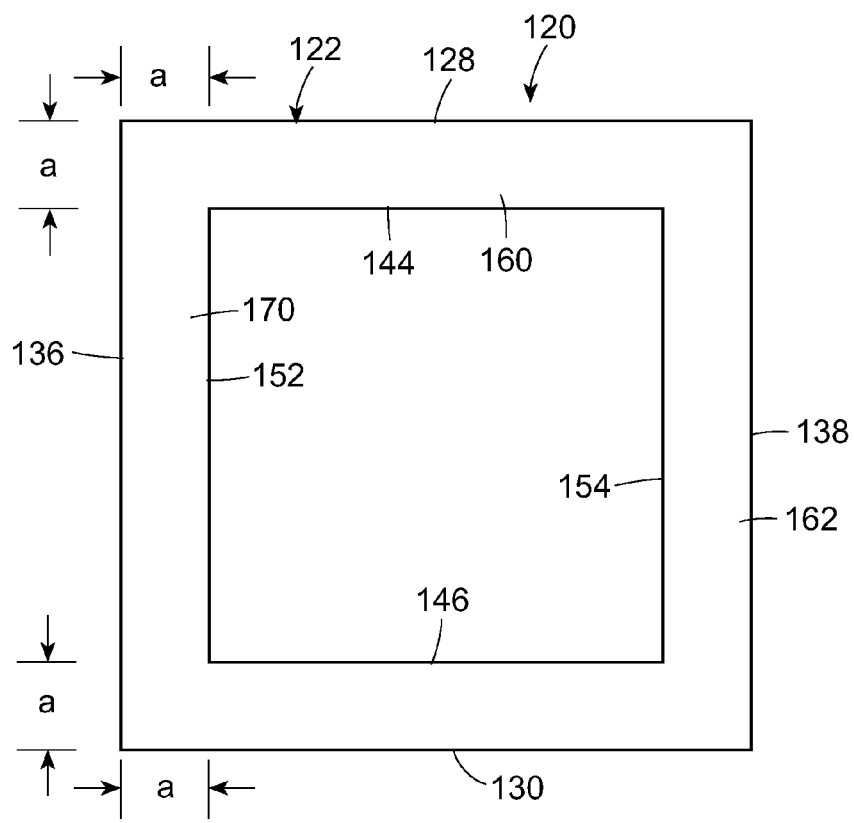
FIG. 15 is a plan view of the packaging system packaging device.

The packaging system 120 includes a one-piece packaging device 122 (FIG. 15) preferably of generally square shape and formed of any suitable known flexible release material such as release paper or releasable plastic that is of a paper thin gauge. A suitable release material is silicone coated paper or equivalent release material.

The packaging device 122 (FIG. 15) has a square outer periphery defined by opposite side portions 128, 130 and 136 and 138. The packaging device 122 also has a square inner periphery defined by opposite side portions 144, 146 and 152 and 154. The distance between the outer peripheral side portions 128, 130, 136 and 138 and the corresponding inner peripheral side portions 144, 146, 152 and 154 is approximately equivalent to the marginal offset "a" of the L-shaped marginal sections 42 and 58.

The length of the outer sides 128, 130, 136 and 138 of the device 122 (FIG. 15) is at least equal to the length of any of the side edges 26, 34, 48, 56 and 32, 40, 46, 50 (FIG. 1) of the layers 14 and 16 plus the marginal offset "a" of the L-shaped marginal sections 42 and 58

The length of the inner sides 144, 146, 152 and 154 of the device 122 (FIG. 15) is approximately equivalent to the length of any of the side edges 26, 34, 48, 56, and 32, 40, 46, 50 (FIG. 1) of the layers 14 and 16 minus the marginal offset "a".

The following reference identifications can be made for the tile 10 and the packaging device 122;

A=the length of any of the side edges 26, 34, 48, 58 and 32, 40, 46, 50 of the layers 14 and 16

C=the length of any of the outer sides 128, 130, 136 and 138 of the device 122

E=the length of any of the inner sides 144, 146 152 and 154 of the device 122 a=the marginal offset of the L-shaped marginal portions 42 and 58

The following relationships between the tile 10 and the packaging device 122 can be expressed in terms of the previous reference identifications as follows, $$C = A + a$$

$$E = A - a$$

Figure 13:
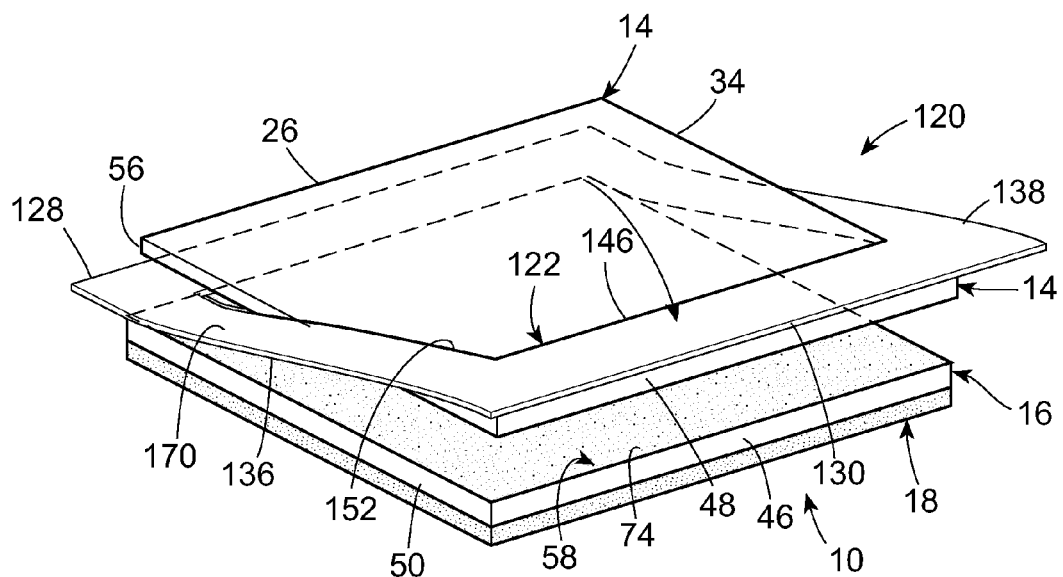
Figure 14:
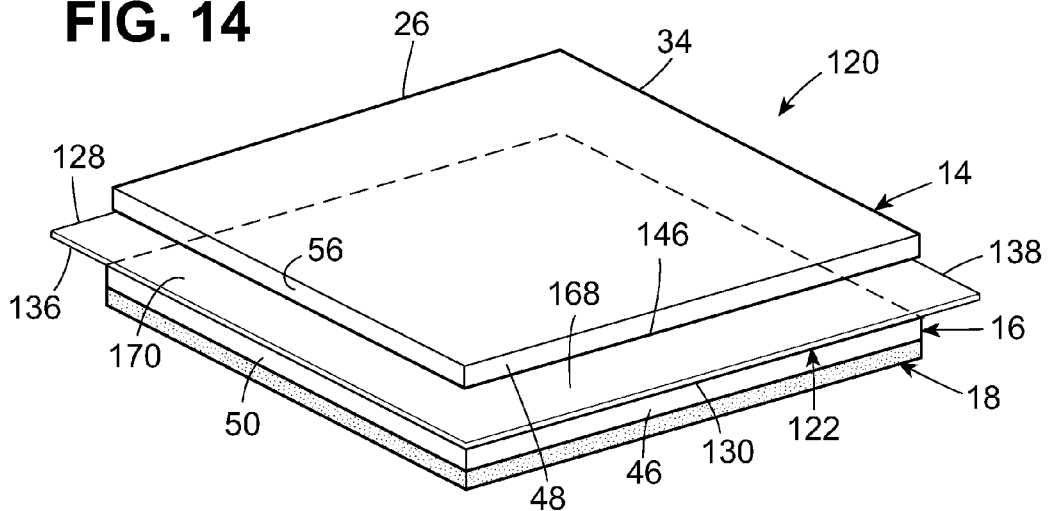

The packaging device 122 is assembled to the floor tile 10 in the manner shown in FIGS. 12, 13 and 14. Thus two intersecting sides 160 and 162 (FIGS. 12 and 15) of the device 122 are placed against the downwardly exposed adhesive surface 72 (FIGS. 1 and 12) of the L-shaped marginal section 42 as shown in FIG. 13, and the remaining two intersecting sides 168, 170 (FIGS. 12 and 15) of the packaging device 122 are placed against the upward exposed adhesive surface 74 (FIG. 1) of the L-shaped marginal section 58.

Under this arrangement the inner side portion 144 of the device 122 is placed against the side edge 32 of the middle layer 16 and the inner side portion 154 of the device 122 is placed against the edge 40 of the middle layer 16. The sides 160 and 162 of the device 122 can thus contact and cover the downwardly exposed adhesive surface 72 of the L-shaped marginal portion 42, as shown in FIG. 13.

After the sides 160 and 162 of the device 122 have been positioned against the downwardly exposed adhesive surface 72 of the L-shaped marginal section 42 the intersecting sides 168 and 170 of the device 122 are moved forward and against the upwardly exposed adhesive surface 74 of the L-shaped marginal section 58 as shown in FIGS. 13 and 14. The inner side portion 146 of the device 122 (FIG. 12) is thus placed against the side edge portion 48 of the top layer 14 and the inner side portion 152 of the device 122 is placed against the side edge portion 56 of the top layer 14.

The device 122 can be stretched slightly, if needed, to accomplish the positioning of the sides 160 and 162 of the device 122 against the downwardly exposed adhesive surface 72 and the positioning of the sides 168 and 170 of the device 122 against the upwardly exposed adhesive surface 74.

In this manner the one piece packaging device 122, preferably of closed square periphery, covers all the exposed adhesive surfaces of both L-shaped marginal sections 42 and 58 even though the panel 10 includes one L-shaped marginal section 42 with a downwardly exposed adhesive surface 72 (FIG. 1) and the other L-shaped marginal section 58 has an upwardly exposed adhesive surface 74.

Thus all exposed adhesive surfaces of the floor tile 10, even though they face in opposite directions at different peripheral sections of the tile 10 can be covered and protected with a one piece packaging device 122 until such tiles are ready for installation. The packaging device 122 when installed on each of the tiles 10 before such tiles are ready for use permits the floor tiles 10 to be stacked one on top of another (not shown) without one tile 10 adhering to another tile 10. The tiles 10 can be stacked for packaging or for display purposes.

Figure 16:
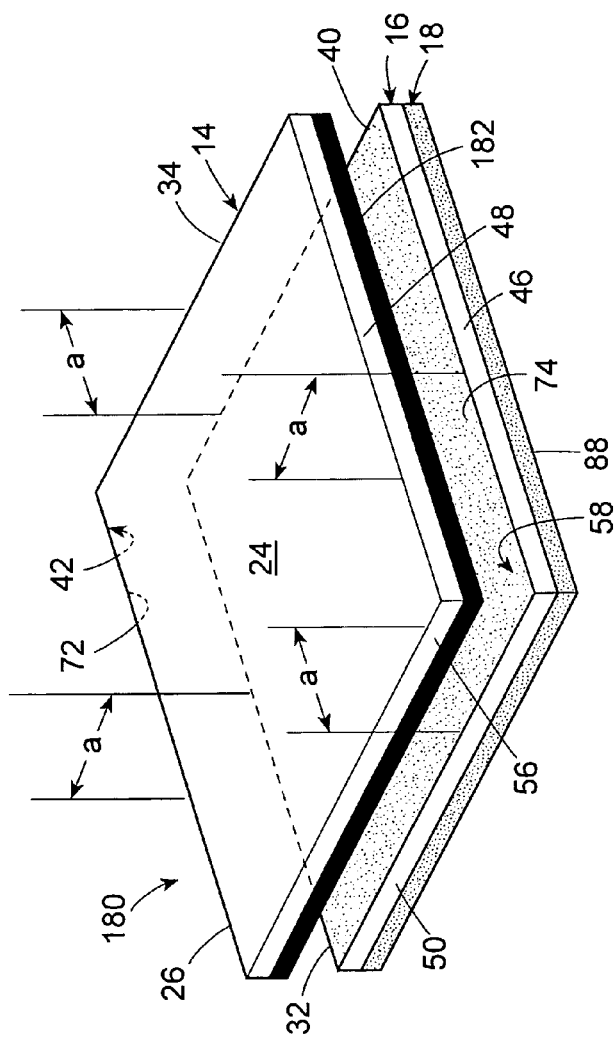
FIG. 16 is a perspective view of a floor tile incorporating a further embodiment of the invention.

A further and preferred embodiment of the floor tile is generally indicated by the reference number 180 in FIG. 16. The floor tile 180 includes all components of the floor tile 10, with the same marginal offsets as previously described, plus an underlayer 182 of flexible fibrous sheet material sandwiched between the top layer 14 and the middle layer 16. The underlayer 182 provides enhanced dimensional stability to the floor tile 180.

The top layer 14 and the underlayer 182 are coextensive and have a common periphery. Preferably the underlayer 182 is formed of a non-woven glass fiber material such as fiberglass, having a thickness of approximately 0.2 mm.

The top layer 14 and the underlayer 182 are bonded to the middle layer 16 in offset relationship such that floor tile 180 includes the identical L-shaped marginal sections 42 and 58 with identical offsets "a" as previously described for the floor tile 10. The marginal section 42 has the downwardly exposed adhesive surface 72 on the underlayer 182 and the marginal section 58 has the upwardly exposed adhesive surface 74 on the middle layer 16.

The adhesive on the exposed surfaces 72 and 74 is the same adhesive used in the floor tile 10 to bond the top layer 14 to the middle layer 16. Thus the same adhesive is used to bond the underlayer 182 to the top layer 14 and to the middle layer 16, and to bond the middle layer 16 to the bottom layer 18.

The floor tile 180 is installed on a floor in a manner similar to that previously described for the floor tile 10.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A floor tile comprising,
a) a first layer of flexible plastic sheet material having a first square shape with at least two side edges, a first upper surface with a design pattern and a first lower surface, the first upper surface with the design pattern constituting the top surface of the floor tile,
b) a second layer of flexible plastic sheet material having a second square shape with at least two side edges, a second upper surface and a second lower surface,
c) said first and second layers being laminated together in offset relationship, and wherein the first lower surface of the first layer contacts the second upper surface of the second layer,
d) the offset lamination of said first and second layers defining a first offset marginal portion of said first layer and a second offset marginal portion of said second layer, said first marginal portion of said first layer extending beyond at least one of the side edges of said second layer, and said second marginal portion of said second layer extending beyond at least one of the side edges of said first layer,
e) said first offset marginal portion having a first marginal lower surface that is part of the first lower surface of said first layer, and said second offset marginal portion having a second marginal upper surface that is a part of the second upper surface of said second layer, the first marginal lower surface and the second marginal upper surface having an exposed adhesive coating,
f) the first and second layers having respective predetermined thicknesses to enable the laminate of the first and second layers to have a flexibility that permits said laminate to conform to surface contours of a floor base upon which the floor tile is laid,
g) the plastic sheet material of said second layer having a predetermined yieldability to surface irregularities of the floor base upon which the floor tile is laid, such that said second layer, when lying in flat contact on the floor base can conform to surface irregularities of the floor base.

2. The floor tile as claimed in claim 1 wherein the first and second square shapes are congruent squares.

3. The floor tile as claimed in claim 2 wherein the first offset marginal portion extends beyond two intersecting side edges of said second layer such that said first offset marginal portion is L-shaped.

4. The floor tile as claimed in claim 2 wherein the second offset marginal portion extends beyond two intersecting side edges of said first layer such that said second offset marginal portion is L-shaped.

5. The floor tile as claimed in claim 3 wherein the second offset marginal portion extends beyond two intersecting side edges of said first layer such that said second offset marginal portion is L-shaped.

6. The floor tile as claimed in claim 1 wherein the first and second layers are formed of a synthetic plastic material.

7. The floor tile as claimed in claim 6 wherein the synthetic plastic is a vinyl material.

8. The floor tile as claimed in claim 7 wherein the synthetic plastic is polyvinyl chloride.

9. The floor tile as claimed in claim 1 wherein the adhesive coating comprises a styrene-isoprene-styrene elastomer resin.

10. The floor tile as claimed in claim 1 wherein the design on the first upper surface of said first layer is a wood grain design that resembles natural wood.

11. The floor tile as claimed in claim 1 including a third layer of flexible foam material having a third square shape, said third layer being bonded to the second lower surface of the second layer and being co-extensive with said second layer such that said second and third layers have a common periphery, the foam material of said third layer having a predetermined thickness and yieldability to surface irregularities of the floor base upon which the floor tile is laid, such that said third layer, can conform to surface contours of a floor base upon which the floor tile is laid and said third layer when lying in flat contact on the floor base can conform to surface irregularities of the floor base.

12. The floor tile as claimed in claim 11 wherein the first, second and third square shapes are congruent squares.

13. The floor tile as claimed in claim 1 including an underlayer of flexible fibrous sheet material bonded between the first and second layers, said underlayer having a fourth square shape and being coextensive with said first layer such that said first layer and said underlayer have a common periphery.

14. The floor tile as claimed in claim 13 wherein said underlayer is formed of fiberglass.

15. The floor tile as claimed in claim 14 wherein the first, second, third and fourth square shapes are congruent squares.

16. The floor tile as claimed in claim 1, including a one piece releasable cover member for covering the adhesive coated first marginal lower surface of said first offset marginal portion and the adhesive coated second marginal upper surface of said second offset marginal portion, said releasable cover member comprising one continuous strip of release material extending on the adhesive coated first marginal lower surface and extending on the second marginal upper surface to cover the exposed adhesive coating of said first and second offset marginal portions, whereby said one continuous strip of release material covers the exposed adhesive coated surfaces of the first and second marginal portions.

17. A floor tile comprising,
   a) a first layer of plastic sheet material having a first square shape with at least two side edges, a first upper surface and a first lower surface,
   b) a second layer of plastic sheet material having a second square shape with at least two side edges, a second upper surface and a second lower surface,
   c) said first and second layers being laminated together in offset relationship, and wherein the first lower surface of the first layer contacts the second upper surface of the second layer,
   d) the offset lamination of said first and second layers defining a first offset marginal portion of said first layer and a second offset marginal portion of said second layer, said first marginal portion of said first layer extending beyond at least one of the side edges of said second layer, and said second marginal portion of said second layer extending beyond at least one of the side edges of said first layer,
   e) said first offset marginal portion having a first marginal lower surface that is part of the first lower surface of said first layer, and said second offset marginal portion having a second marginal upper surface that is a part of the second upper surface of said second layer, the first marginal lower surface and the second marginal upper surface having an exposed adhesive coating,
   f) a releasable cover member for covering the adhesive coated first marginal lower surface of said first offset marginal portion and the adhesive coated second marginal upper surface of said second offset marginal portion, said releasable cover member comprising one continuous strip of release material extending on the exposed adhesive coating of said first marginal lower surface and extending on the second marginal upper surface to cover the exposed adhesive coating of said first and second offset marginal portions, whereby said one continuous strip of release material covers the exposed adhesive coated surfaces of the first and second marginal portions.

18. The floor tile as claimed in claim 17 wherein the cover member has a closed square periphery.

19. The floor tile as claimed in claim 17 wherein the cover member has an outer periphery of square shape.

20. The floor tile as claimed in claim 19 wherein the cover member has an inner periphery of square shape, and an inside square space surrounded by the inner peripheral square shape of the cover member.

21. The floor tile as claimed in claim 17 wherein the cover member is a one piece member.

22. A method of covering exposed adhesive portions of a floor tile comprising a laminate of two layers of plastic sheet material both of identical square shape, laminated together in offset relationship to define an offset marginal portion for each of the layers, such that the offset marginal portion of each layer extends beyond at least two side edges of the other layer, each of the offset marginal portions having oppositely facing adhesive coated surfaces, said method comprising providing one continuous strip of flexible releasable material to cover the exposed adhesive coated surfaces of both of the offset marginal portions by contacting a first portion of the releasable cover material against the adhesive coating of one offset marginal portion and contacting a second portion of the releasable cover material on the adhesive coated surface of the other offset marginal portion.

23. The method of claim 22 including forming the releasable material with a closed square periphery.

24. The method of claim 22 including forming the releasable material with a square outer periphery and a square inner periphery, and an open inner square space surrounded by the releasable material.

25. The method of claim 22 wherein the releasable material is a silicone coated paper.

26. The method of claim 22 including forming the releasable material as a one piece member.

* * * * *

UNITED STATES PATENT AND TRADEMARK OFFICE
CERTIFICATE OF CORRECTION

PATENT NO.         : 7,458,191 B2                                    Page 1 of 1
APPLICATION NO.    : 11/595559
DATED              : December 2, 2008
INVENTOR(S)        : Norman Stone It is certified that error appears in the above-identified patent and that said Letters Patent is hereby corrected as shown below:

On the Title Page at Item (73) Assignee:
change "Norwalk, Connecticut (US)"
to --Hong Kong, CHINA--.

Signed and Sealed this
Third Day of July, 2012

David J. Kappos
*Director of the United States Patent and Trademark Office*